(12) United States Patent
McGuire

(10) Patent No.: US 6,595,152 B2
(45) Date of Patent: Jul. 22, 2003

(54) APPARATUS AND METHOD FOR REMOVING COATINGS FROM THE HULLS OF VESSELS USING ULTRA-HIGH PRESSURE WATER

(75) Inventor: Dennis McGuire, Stuart, FL (US)

(73) Assignee: Ultrastrip Systems, Inc., Stuart, FL (US)

( * ) Notice: Subject to any disclaimer, the term of this patent is extended or adjusted under 35 U.S.C. 154(b) by 0 days.

(21) Appl. No.: 09/956,494

(22) Filed: Sep. 18, 2001

(65) Prior Publication Data

US 2003/0000445 A1 Jan. 2, 2003

Related U.S. Application Data (63) Continuation of application No. 08/854,384, filed on May 12, 1997, now Pat. No. 6,425,340, which is a continuation of application No. 08/408,382, filed on Mar. 22, 1995, now Pat. No. 5,628,271.

(51) Int. Cl.[7] ............................................... B63B 59/08
(52) U.S. Cl. ...................................... 114/222; 239/251
(58) Field of Search .................. 114/222; 239/251; 15/1.7, 322; 180/234, 901

(56) References Cited

U.S. PATENT DOCUMENTS

| | | | |
|---|---|---|---|
| 2,104,062 A | 1/1938 | Temple | |
| 2,132,661 A | 11/1938 | Temple | |
| 3,088,429 A | 5/1963 | Johannessen | |
| 3,161,900 A | 12/1964 | Hornschuch et al. | |
| 3,609,612 A | 9/1971 | Tibbling | |
| 3,922,991 A | * 12/1975 | Woods | 114/222 |
| 3,960,229 A | 6/1976 | Shio | |
| 3,984,944 A | 10/1976 | Maasberg et al. | |
| 4,132,279 A | 1/1979 | van der Lende et al. | |
| 4,149,345 A | 4/1979 | Atsuchi | |
| 4,168,562 A | * 9/1979 | Maasberg | 15/320 |
| 4,462,328 A | 7/1984 | Oram | |
| 4,574,722 A | 3/1986 | Orita et al. | |
| 4,690,092 A | 9/1987 | Rabuse | |
| 4,697,536 A | 10/1987 | Hirana | |
| 4,926,775 A | 5/1990 | Andorsen | |
| 5,028,004 A | * 7/1991 | Hammelmann | 239/120 |
| 5,048,445 A | * 9/1991 | Lever et al. | 114/222 |
| 5,129,355 A | * 7/1992 | Taylor et al. | 118/302 |
| 5,199,226 A | * 4/1993 | Rose | 451/36 |
| 5,205,174 A | 4/1993 | Silverman et al. | |
| 5,321,869 A | * 6/1994 | Kaempf | 15/322 |
| 5,577,293 A | 11/1996 | Meredith et al. | |
| 5,628,271 A | 5/1997 | McGuire | |
| 5,849,099 A | 12/1998 | McGuire | |
| 6,425,340 B1 | * 7/2002 | McGuire | 114/222 |

FOREIGN PATENT DOCUMENTS

| | | |
|---|---|---|
| CH | 679 131 | 12/1991 |
| JP | 62-268782 | 11/1987 |

\* cited by examiner

Primary Examiner—Sherman Basinger
(74) Attorney, Agent, or Firm—McHale & Slavin, P.A.

(57) ABSTRACT

A method and apparatus for removing coatings from the hull of a ship using a steered magnet vehicle supported by the adhesion force only of a permanent magnet to the surface to be treated. Using an ultra-high pressure water jet system and method for removing coatings, paint, deposits, organic and inorganic from hulls without harming the substrate material and to provide a superior surface for the application of subsequent coatings.

10 Claims, 7 Drawing Sheets

APPARATUS AND METHOD FOR REMOVING COATINGS FROM THE HULLS OF VESSELS USING ULTRA-HIGH PRESSURE WATER

This application is a continuation application of application Ser. No. 08/854,384, filed May 12, 1997, and now U.S. Pat. No. 6,425,340, which is a continuation of Ser. No. 08/408,382, filed Mar. 22, 1995, and now U.S. Pat. No. 5,628,271.

BACKGROUND OF THE INVENTION

1. Field of the Invention

The present invention pertains to a method for the removal of surface coatings from various surfaces. In particular, this invention pertains to a method of using ultra-high pressure water to remove surface coatings, including paint, to expose the metal hulls of ships. A remotely controlled platform having a ferro-magnetic and motive means moves the ultra-high pressure nozzles about the surface to be treated. An alternate embodiment of the invention incorporates a recycling and waste disposal system whereby the water is recovered, the coating particulate removed and the water reused as an abrasive.

2. Description of the Prior Art

The marine environment is extremely demanding on coatings applied to hulls, or other bodies, which are submerged for long periods of time. The corrosive properties of salt water are well known, and in this hostile environment even the most durable coating must be replaced periodically.

The degree of surface roughness of submerged portions of ships has a great effect on both ship fuel efficiency and the speed which can be achieved at a given propeller revolution rate. Roughness can be caused by marine growth ("fouling"), degradation of hull coatings, and deterioration of unpainted surfaces such as propeller blades. For commercial, private or military ships, losses in ship performance can have a variety of consequences, both financial and in terms of meeting scheduled arrival dates.

Although the following examples are for a VLCC Very Large Crude Carrier; an oil tanker, with the following typical approximate specification: 272,000 tons deadweight; total engine horsepower (at 90 RPM propeller rate): 32,700 hp, examples could be given for any size or type of marine craft. A typical trip for a VLCC is from the U.S. Gulf Coast to the eastern end of the Mediterranean Sea, This round trip normally takes about 40 days. However, with an increased surface roughness causing a loss in peak speed of only 1 knot (nautical mile per hour), 2½ days would be added to the trip.

Considering the effect of surface roughness on efficiency, for a VLCC, each increase of 1 RPM in propeller rotation rate corresponds to an increase in ship speed of about 0.15 knot. Thus, a roughness caused loss of one knot would require an increase of about 6.7 RPM to maintain the same ship speed (i.e., to overcome the increased ship resistance). This increased propeller speed requires 20 tons (metric ton) per day of extra fuel.

Marine engineers estimate that an increase in the average roughness of a ship's hull of about 30 microns (peak-to-peak, RMS roughness) can cause a drop in peak achievable speed of about one percent. A new hull can have a surface roughness of about 160 micron and a deteriorating coating can be about 280 micron. This roughness increase could cause a four percent drop, which for a typical 16 knot VLCC peak speed is a loss of about 0.64 knots.

The foregoing clearly demonstrates the economic importance of maintaining the submerged surfaces of ships in as smooth a condition as is practical. Therefore providing a means to maintain surface smoothness of ships is a practical and economical objective for ship owners.

Fouling of ship bottoms not only reduces fuel efficiency, thus increasing operating costs, but also attacks the integrity of the coating which leads to corrosion and metal fatigue. Corrosion damage to hulls can lead to costly repairs, loss of operating time and, if unchecked, to the premature scrapping of the vessel. Environmental laws hamper fouling prevention by limiting the types of paint which may be used, especially those containing organotin/tributylin and cuprous oxides which are most effective in controlling calcerous fouling. Thus, because the most effective preventive measures against fouling are unavailable it has become necessary to replace coatings more frequently. The coatings which can be applied under current laws need a superior surface finish in order to extend the life of the coating on the surface. Astute ship owners realize a superior surface finish extends the life of the coatings and reduces drydock time and expenses in the future.

There are presently three existing cleaning methods which are used for cleaning ship's hulls:

1. Chemical paint strippers are currently used to remove small patches on a ship's hull, as is required for non-destructive testing and access cuts. This method is unsuitable for leaning the entire ship's hull and it creates large amounts of toxic waste for each area cleared;

2. Abrasive grit blasting is used for cleaning the entire hull. Current hull cleaning methods using abrasive grit generate tons of abrasive that must be detoxified if used on the organic paint, and millions of gallons of water that must be treated annually. Satisfactorily methods have not been developed to manage the organic waste during the application of the paint, removal of spent paints in dry-dock prior to repainting, and detoxification of the grit and other wastes generated during the present abrasive blasting method used;

3. High pressure water jet systems which use water, pressures of less than 10,000 psi, are usually applied by a hand held nozzle. The prior art water nozzles lacked sufficient pressure, typically less than 10,000 PSI, to completely remove paint from the surface of a hull Another major disadvantage or prior art rotary water jets is the slow rate at which multiple layers, or very hard coatings, can be removed.

To fully remove coatings from hulls it is necessary to construct platforms for operators from wooden bars or rods, or by suspending gondolas or cradles or the like from above, when blasting. Thus, the operators must work by hand on such platforms located at a considerable height. For this reason, the operation is dangerous and, in addition to this, the efficiency of removal is extremely low. To overcome this disadvantage, various steered vehicles have been proposed. However, such vehicles heretofore proposed have proved to be unsatisfactory, for example, in that when the vehicle is driven over a surface having a certain curvature instead of a flat plane of a structural member, it is not possible to obtain a sufficient adhesion force for supporting its weight and further that it tended to sometimes damage the operation surface due to the contact pressure exerted between the vehicle and the operation surface.

Some vehicles use permanent magnet means and/or electromagnet means mounted thereon, and are driven by magnetic belts provided on both sides of the vehicle. Changing the direction of travel of a vehicle of this type requires remarkable skill as the apparatus has the tendency of slipping at the contact area either of the right or left belts during the turn of the vehicle owing to the change in the contact pressure between the vehicle and the wall surface.

Some examples of the prior art are:

Hirosha et al U.S. Pat. No. 3,777,834 discloses a magnet vehicle supportedly adhered to and adapted to run over an inclined wall surface of a structural member made of a strong magnetic material such as iron and steel, characterized in that the vehicle can be altered of its direction of travel as desired on the surface.

Woods U.S. Pat. No. 3,922,991 discloses an apparatus for cleaning relatively large, flat, ferro-metallic surfaces of corrosion, scale, paint and undesirable marine growths, the apparatus having high pressure fluid blasting assembly, magnetic attachment device, driving motor, and a signal generating and receiving system for guiding the apparatus along the surface to be cleaned.

Cadutt U.S. Pat. No. 4,890,5.67 discloses a robotically operated device using an ultrasonic transducer for the cleaning of ships' hulls. The device may also be used for spraying paints or other chemicals on the sides of ships' hulls. The device includes a housing having an open face adapted to confront a ship's hull and apparatus disposed in the housing for impinging a flow of fluid through the open face onto the ship's hull. An ultrasonic transducer is disposed in the housing for impinging a flow of ultrasonic energy through the open face onto the ship's hull. Apparatus connected to the outside of the housing retains the housing on the ship's hull and moves the housing on the ship's hull. In an additional embodiment, apparatus for spraying paint or other chemicals on a ship's hull is disposed in the housing.

Andosen U.S. Pat. No. 4,926,775 discloses a cleaning apparatus for use under water, particularly for cleaning vertical surfaces which are fouled by marine organisms. One or more nozzles for spraying water at high pressure at a surface to be cleaned are arranged on a rotary disc-shaped unit where the rotation axis is intended to be generally perpendicular to the surface which is to be cleaned. The nozzles are obliquely located in a circular plane so that the rotating unit can rotate. Beyond the periphery of the rotating unit there is a casing which forms an annular chamber with an outlet which is at least partly directed away from the surface which is to be cleaned. The annular chamber is formed from two generally cylindrical, or truncated conical casing units which are positioned at a radial distance from each other with their internal ends concentric with respect to the nozzle holder.

Rabuse U.S. Pat. No. 4,690,092 discloses an aquatic scrubbing device for attachment to an underwater ferromagnetic surface incorporates a carriage, at least two independently energizable electromagnets supported by the carriage for rotation about mutually parallel axes, and at least one drive motor for rotating the electromagnets relative to the carriage, whereby alternative energization of the electromagnets and the drive motors will cause a walking motion of the carriage when attached to the ferro-magnetic surface, the device incorporating rotatable scrubbers for removing aquatic growths from that surface.

Lever et al U.S. Pat. No. 5,048,445 discloses providing a fluid jet system for underwater maintenance of a ship hull. The fluid jet system includes an open frame cart having a high pressure fluid nozzle manifold for cleaning and smoothing the submerged hull of the ship. One or more thruster assemblies are provided on the cart for deploying the cart through the water, advancing the cart along the hull and maintaining the cart in contact with the hull. Control of the thruster assembly and fluid flow manifold can be effected from either longitudinal end of the cart. Flexible fluid flow lines interconnect the cart to one or more remote sources of pressurized fluid so that the cart is independently operable. A system for deploying the cart is further provided and includes the necessary high pressure pumps, devices for hose deployment and retrieval, and diver supplies. Finally, a system of underwater maintenance of ship performance is provided whereby the condition of the hull of the ship is monitored and areas to be cleaned and smoothed are determined in order of priority based upon projected improvement to ship performance.

Hirana U.S. Pat. No. 4,697,536 provides for vessels and the like which require cleaning either periodically or whenever a need arises to remove various living things such as seaweeds and shells or contaminants such as oil for the sake of appearance and proper performance. Divers were conventionally employed to manually remove them one by one using a scraper as one means to remove such substances. Such manual operation is, however, extremely inefficient, involving great amounts of time and labor especially for large ships. The main body of a cleaning apparatus is pressed against an underwater object to be cleaned by means of impellers which are provided substantially at the center of the main body and driven to rotate, whereby cleaning brushes which are provided at the bottom of the cleaning apparatus concentrically with the impellers are rotated to remove substances adherent to the object while the cleaning apparatus is manipulated to run on the object's surface. Two pairs of an impeller and a brush are provided in parallel at the normal angle to the direction of forward and backward movement of the cleaning apparatus. The impellers and the brushes are driven by the same driving source as they are connected to the impellers by means of a universal joint.

Urakami U.S. Pat. No. 4,809,383 discloses a device capable of adhering to a wall surface by suction by the pressure of an ambient fluid and treating the wall surface, which comprises a pressure receiver member and a partition defining a pressure reduction zone in cooperation with the pressure receiver member and the wall surface. In one aspect, the partition has a sealing function of preventing inflow of a large amount of an outside fluid into the pressure reduction zone, and a treating function of treating the wall surface by being moved in a required manner. In another aspect, the partition has the above sealing function, and a travelling function of moving the device, by being rotated about an axis of rotation slightly inclined to an axis which is substantially perpendicular to the wall surface.

Okita et al U.S, Pat. No. 4,574,772 discloses an underwater cleaning apparatus having a carrier, a plurality of wheels for shifting the position of the carrier along a submerged surface, a plurality of rotary brushes carried by the carrier and adapted to clean the submerged surface, and a source of power for rotating the rotary brushes. The apparatus further comprises flexible partition wall members for transmitting torque to the rotary brushes and forming reduced pressure chambers communicated with spaces formed by bristles of respective rotary brushes. As the rotary brushes rotate, the rotary brushes and the partition wall members in combination serve to provide vacuum to produce a force to press the carrier through the wheels onto the submerged surface to be cleaned. In addition, each of the rotary brushes are allowed to individually follow the configuration of the surface thanks to the flexibility of the partition wall members.

In view of the substantial cost and time savings afforded by maintaining the submerged surfaces of ships in as smooth a condition as possible and by avoiding frequent dry docking and in view of the problems with previous systems for ship hull paint removal, it is an object of the invention to provide a system and method for removing coatings from the metal substrate of a hull.

SUMMARY OF THE INVENTION

A preferred embodiment of this invention is an apparatus for removing coatings from the ferro-magnetic hulls of ships, to comprising body means having a frame means and a cowling means, seal means on said cowling means for providing sealing contact between said apparatus and said hull, motor means, steering means, a plurality of magnetically tractive, steerable motive means connected to said motor means, wherein said motor means drives said plurality of magnetically tractive steerable motive means, ultra-high pressure water jet means attached to said body means, said ultra-high pressure water means directed toward said ship hull, and a conduit means passing through said cowling means and communicating with said ultra-high pressure water means for the passage of ultra-high pressure water, and with said motor means.

Another preferred embodiment of the apparatus for removing coatings from the ferro-magnetic hulls of ships comprises body means having a frame means and a cowling means, a seal means on said cowling means for providing sealing contact between said apparatus and said hull, a motor means, wherein said motor means is an electric motor and further having an electrical power transmission means contained within said conduit and further comprises a gearbox, a plurality of drive shafts having a first and second ends, a plurality of universal joints having a first and second end, said universal joint first end connected to said gearbox and said universal joint second end connected to said drive shaft first end, and wherein, said drive shaft second end is attached to said magnetically tractive motive means, a steering means, wherein said steering means is by means of remote control radio signals received by said steering means, a plurality of magnetically tractive, steerable motive means connected to said motor means, wherein said motor means drives said plurality of magnetically tractive steerable motive means and wherein said magnetically tractive steerable motive means comprises eight wheels in four pairs, wherein each wheel is independently steerable, a ultra-high pressure water jet means attached to said body means, said ultra-high pressure water means directed toward said ship hull, wherein the ultra-high pressure water jet means consists of at least one rotatable nozzle having orifices, and wherein said water pressure is at least about 25,000 PSI and preferably, at least 30,000 PSI and most preferably at least about 35,000 PSI, said ultra-high pressure water jet means having a circular outer sheath, having inner and outer walls and distal and proximate ends, said outer sheath being disposed about said nozzle, said outer sheath inner wall and the exterior of said nozzle defining a generally conical chamber open at both ends, said outer sheath distal end having a water sealing means to retain said high pressure water after impingement, a suction means, said circular outer sheath proximate end attached to said suction means for removing said water after impingement, a conduit means passing through said cowling means and communicating with said ultra-high pressure water means for the passage of ultra-high pressure water, and said motor means, a water collection means for collecting said ultra-high pressure water after impingement on said hull and said coating particles removed from said hull, a particle separating means for separating said water from said surface coating particles, a transferring means to transfer said water and said coating particles to said particle separating means from said water collection means, a particulate collecting means for collecting said coating particles, a water storage means for holding said water for reuse as an abrasive after separating said coating particles, a pumping means to pump said water to said water storage means, a recycling means for transferring water from the water storage means to the water jet after removal of said particulate of surface coatings.

A preferred method for removing surface coatings from a metal vessel hull comprises providing a nozzle for directing ultra-high pressure water against the hull of a ship, said nozzle mounted to the body of magnetically tractive, steerable, motorized platform, providing ultra-high pressure water and power to said motorized platform via a conduit, and steering said motorized platform via a steering means to move said motorized platform supporting said ultra-high pressure nozzle over the hull of the ship while said ultra-high pressure water removes said coating and where said ultra-high pressure water is at least about 30,000 PSI and most preferably at least about 35,000 PSI.

Another preferred method for removing surface coatings, including paint from a metal vessel hull comprises providing a nozzle for directing ultra-high pressure water against the hull of a ship, said nozzle mounted to the body of magnetically tractive, steerable, motorized platform, providing ultra-high pressure water and power to said motorized platform via a conduit, and steering said motorized platform via a steering means to move said motorized platform supporting said ultra-high pressure nozzle over the hull of the ship while said ultra-high pressure water removes said coating and where said ultra-high pressure water is at least about 30,000 PSI and most preferably at least about 35,000 PSI, collecting said ultra-high pressure water after impingement on said hull and containing coating particles removed from said hull by collecting means, separating said water from said coating particles by means of a particle separating means, transferring said water and said coating particles to said particle separating means from said water collection means by a transferring means, collecting said particulate by means of a particulate collecting means, storing said water in a water storage means for holding said water for reuse as an abrasive after separating said coating particulate, pumping said water to said water storage means by means of a water pumping means, and recycling said water by a recycling means for transferring water from said water storage means to the water jet after removal of said particulate of surface coatings.

Other objects, features and advantages of the present invention will become apparent to those skilled in the art from the following detailed description and attached drawings.

DETAILED DESCRIPTION OF THE PREFERRED EMBODIMENTS

The present inventive subject matter relates to removing surface coatings from a hull of a vessel and more particularly to removing the surface coating all the way to the bare metal surface, also referred to as the "white metal". The process basically involves the use of water at very high pressures which when directed to the hull strips away all surface coating layers. A remotely controlled platform having a ferro-magnetic and motive means moves the ultra-high pressure nozzles about the surface to be treated. As used herein the term "surface coating" refers to all materials that are adhered to the white metal and include without limitation, paint, salt, minerals, rust, dirt, plant and animal growth matter such as algae and barnacles, welding material and materials used to patch the surface of the hulls to prevent water leaks, and mixtures thereof.

The present invention provides a steered magnet vehicle which can alter its direction of travel with high reliability, ease, and in a considerably restricted area. The magnetic vehicle which can be supported on a structural member by the adhesion force only of a permanent magnet means. This invention also enables the use of a ultra-high pressure water jet system and method for removing coatings, paint, deposits, organic and inorganic from hulls without harming the substrate material and to provide a superior surface for the application of subsequent coatings. This invention improves on standard water jet technology, which uses direct impingement of the water to loosen and remove the coating by directing complimentary streams of water whereby the surface is cleaned not only by the blast effect of the water but also by the tangential water forces of the concentric circles which is more efficient than removing coatings only by direct impingement. Additionally, the present invention reduces the amount of waste product that is environmentally hazardous. Water is the sole abrasive and as such it can be filtered, the hazardous particulate removed, and then recycled and returned to be reused as a stripper or disposed of without polluting the environment. Thus, hull stripping, which previously produced tons of contaminated abrasive and required expensive hauling of the contaminate to an approved landfill for disposal, now only produces a few fifty-five gallon drums of stripped paint which is more readily disposed of.

Further, it has been found that not only is there no noticeable damage to the hull surface, but the cleaning operation itself is accomplished very efficiently, and the hull surface is virtually free of contaminants. Traditional methods of stripping paint from the hull of a ship often times scored the metal substrate, leaving peaks and valleys on the surface of the metal. Coats of paint subsequently applied to the metal adhered to the peaks, leaving gaps between the paint and the substrate which weaken the adhesive strength of the coating. The present invention does not score the surface of the metal, thus allowing uniform adhesion.

The present invention also removes contaminants, especially chlorides and sulfides, preventing the future encroachment of rust on the cleaned area which also improves the adhesion characteristics of paint coatings subsequently applied to the stripped metal. Traditional abrasive blasting leaves surface steel with chloride levels higher than the present process. Furthermore, traditional abrasive blasting produces chloride, levels of 20 micrograms per cubic centimeter, as compared to less than 10 and preferably less than 5 micrograms per cubic centimeter with the present process. It is recognized that there is a direct correlation between coatings failures and high salt levels. The more salt remaining on a prepared surface, the lower the adhesion levels, and the shorter the life of the coating. The present process removes 75% more salt and surface contaminants than traditional abrasive blasting and significantly extends the life of the coating. As such, the present process is: (1) less expensive than traditional abrasive blasting; (2) faster than traditional abrasive blasting; (3) produces a far superior surface than traditional abrasive blasting; and (4) significantly extends the life of coatings and reduces drydock time.

Figure 1:
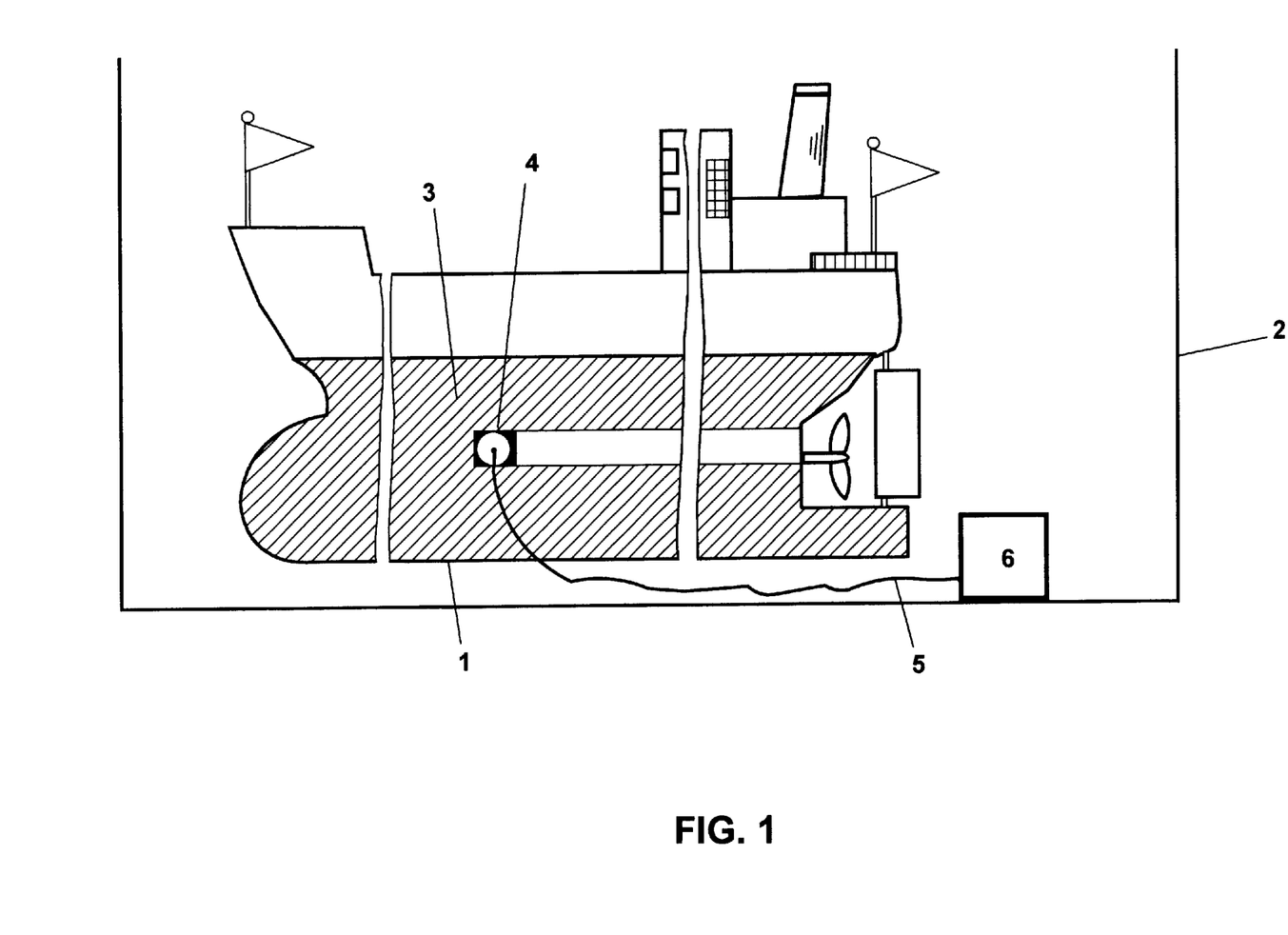
FIG. 1 is view of a ship in drydock with the coatings being removed.

FIG. 1 depicts ship 1 in drydock 2 where coating 3 is to be removed from a metal hull. A motorized, steerable, magnetically tractive platform 4 supports the ultra-high pressure water nozzle 20 and moves it about the surface to be treated. Umbilical cable 5 provides power and ultra-high pressure water and vacuum suction to platform 4 from support structure 6.

Figure 2:
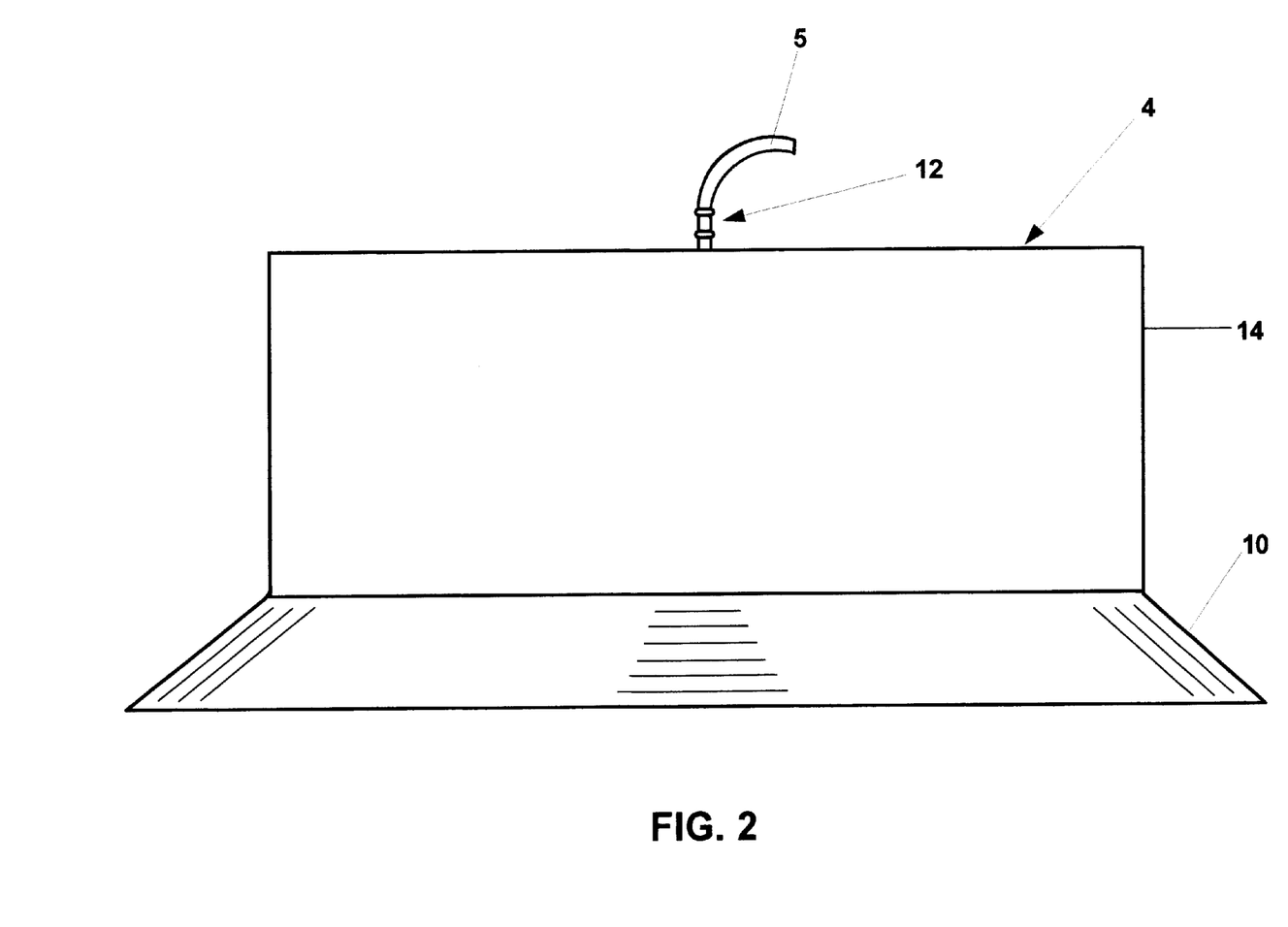
FIG. 2 is an elevation view of the motorized tractive platform, with cowling and skirt.

FIG. 2 is and exterior elevational view of motorized, steerable, magnetically tractive platform 4. Umbilical cable 5 attaches platform 4 by means of rotatable and flexible connector 12. Connector 12 freely moves so that umbilical cable 5 will hang vertically from the platform to the floor of drydock 2, thus allowing for unimpeded passage of high pressure water and power up to platform 4, and return of the water after use with particulate matter. Umbilical cable 5 carries the ultra high pressure water, vacuum, electrical utility and pneumatic lines. Cowling 14 is a lightweight shell, made of fiberglass, which covers platform 4. Skirt 10 is attached to the base of cowling 14 and is made of any flexible material, such rubber, nylon, silicons resin and plastics which will provide a general watertight seal between skirt 10 and the ship hull. The purpose of skirt 10 is to capture any excess water not suctioned by the vacuum system described below.

Figure 3:
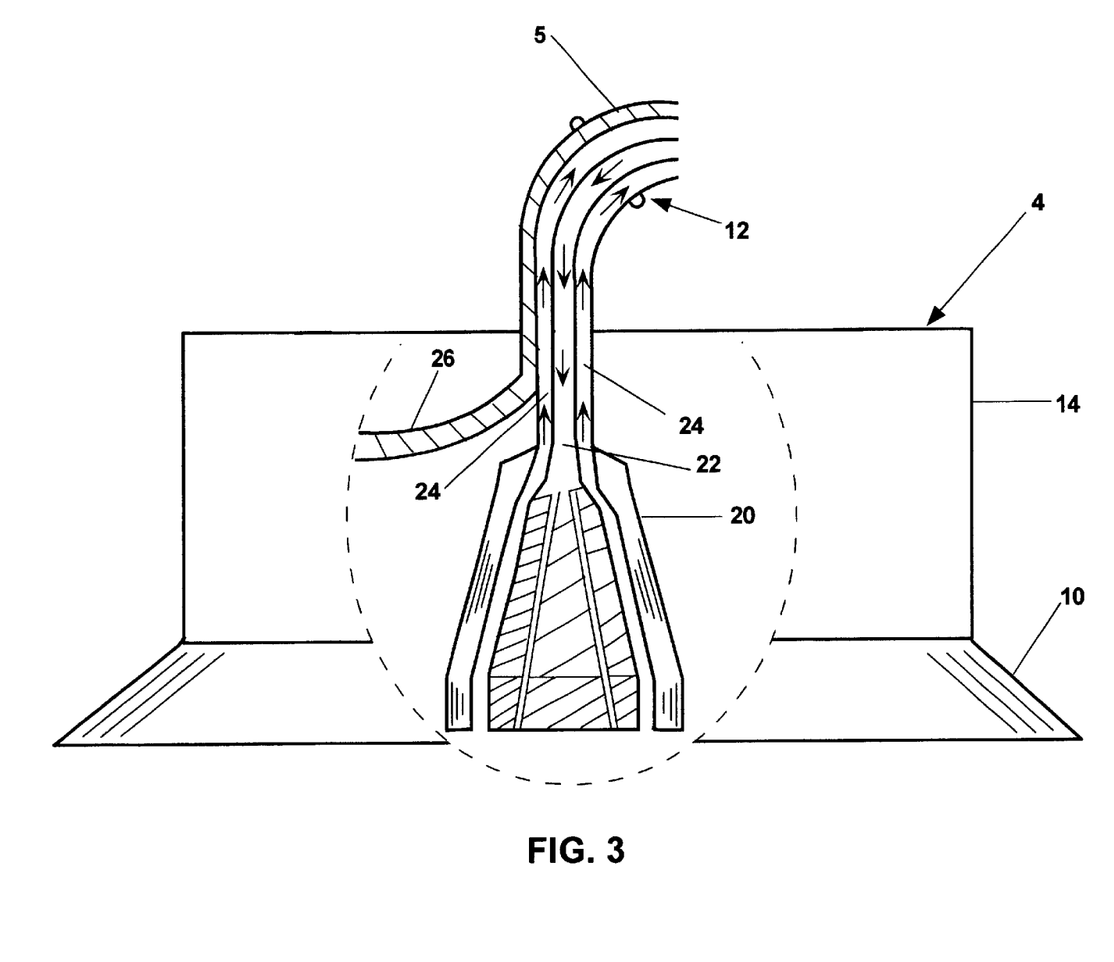
FIG. 3 is a cutaway view of the motorized tractive platform.

FIG. 3 is a cutaway view of platform 4 wherein nozzle 20 is shown. Umbilical cable 5 has conduit 22 for carrying ultra-high pressure water to nozzle 20. After the ultra-high pressure water has impinged on ship 1 the water, and any particulate suspended therein, are collected via suction line 24 for recycling. Electrical power enters via cable 26. If pneumatic power is required to operate platform 4 a pneumatic cable is added to umbilical cable 5.

Figure 4:
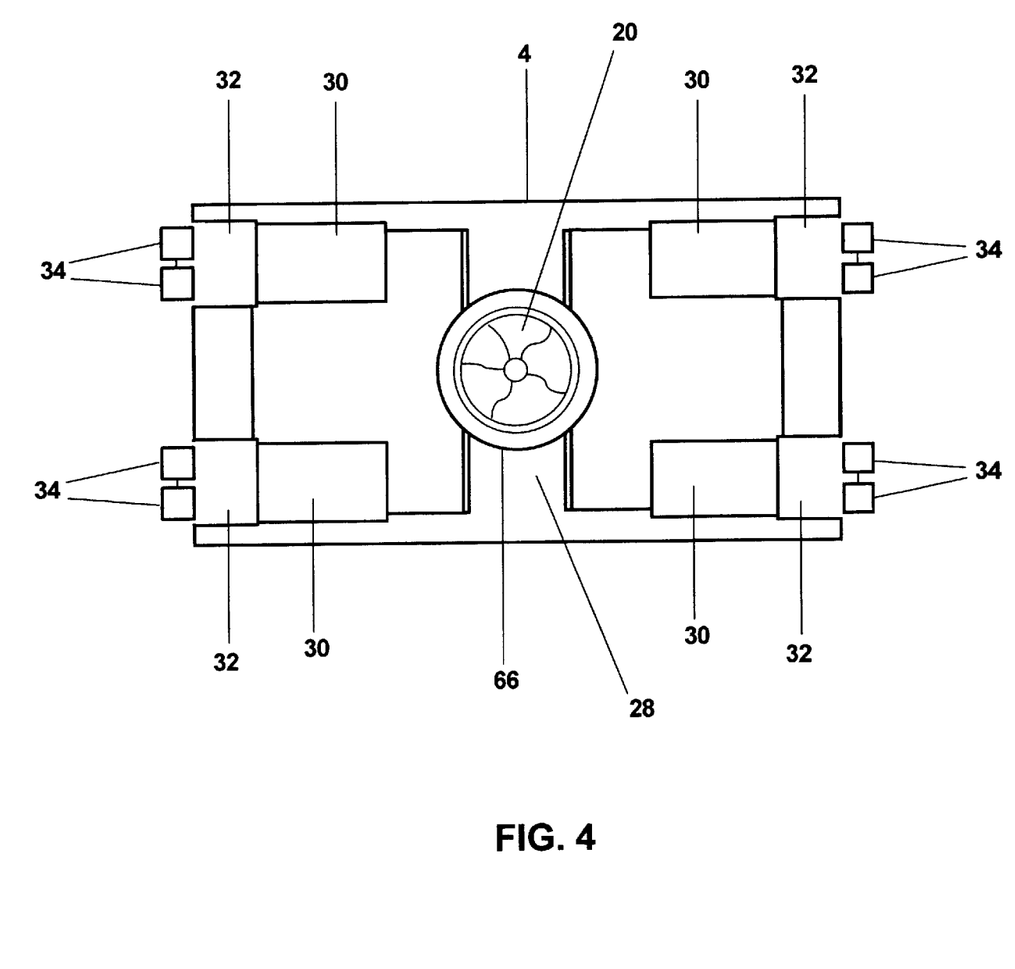
FIG. 4 is an overhead view of the motorized platform without cowling, skirt or umbilical.

FIG. 4 depicts platform 4 without cowling 14 and skirt 10. Platform 4 is made of lightweight aluminum or stainless steel having a load bearing capacity of about two hundred pounds. Nozzle 20 is inserted into aperture 66 in cross-beam 28. Motor 30 drives wheels 34 which are steered by steering units 32. The steering unit 32 may receive signals via control wires or via radio control signals from a remote unit. The radio signals which are received and interpreted by the steering unit 32 direct the apparatus to travel over the hull of the ship, thereby allowing the apparatus to alter its direction with a high degree of reliability and ease, even in confined spaces. The apparatus can be directed from a location away from the ship being cleaned, thereby offering an increased degree of safety to the operator. The steering unit 32 may receive signals via control wires or via radio signals from the remote unit. A preferred embodiment of wheels 34 are 4¼" by 2½" three polo neodymium-iron-boron permanent magnet having a holding power in excess of two thousand pounds. Motor 30 should provide sufficient power to move a combined vehicle weight of two hundred pounds and overcome the static inertia of the magnetic tractive force of wheels 34. A preferred embodiment uses a 24V DC permanent magnet electric motor producing 4000 RPM, with an integrated gearbox having gearing to the output shaft and bevel gear to reduce the RPM by a factor of 40 to 1, to turn a wormgear drive which produces sufficient torque to overcome the magnetic tractive force. Universal joints, not shown, connect the drive shaft to the gearbox to allow for flexibility and contact between the drive shaft and gearing during motion of the device over the hull. Methods which can be used to drive platform 4 need not be limited to that described above. Pneumatic or hydraulic motors are also alternate sources of power, and wheels 34 can be directly driven from one motor for each pair, one motor for multiple pairs of wheels, or one motor for all wheels.

Figure 5:
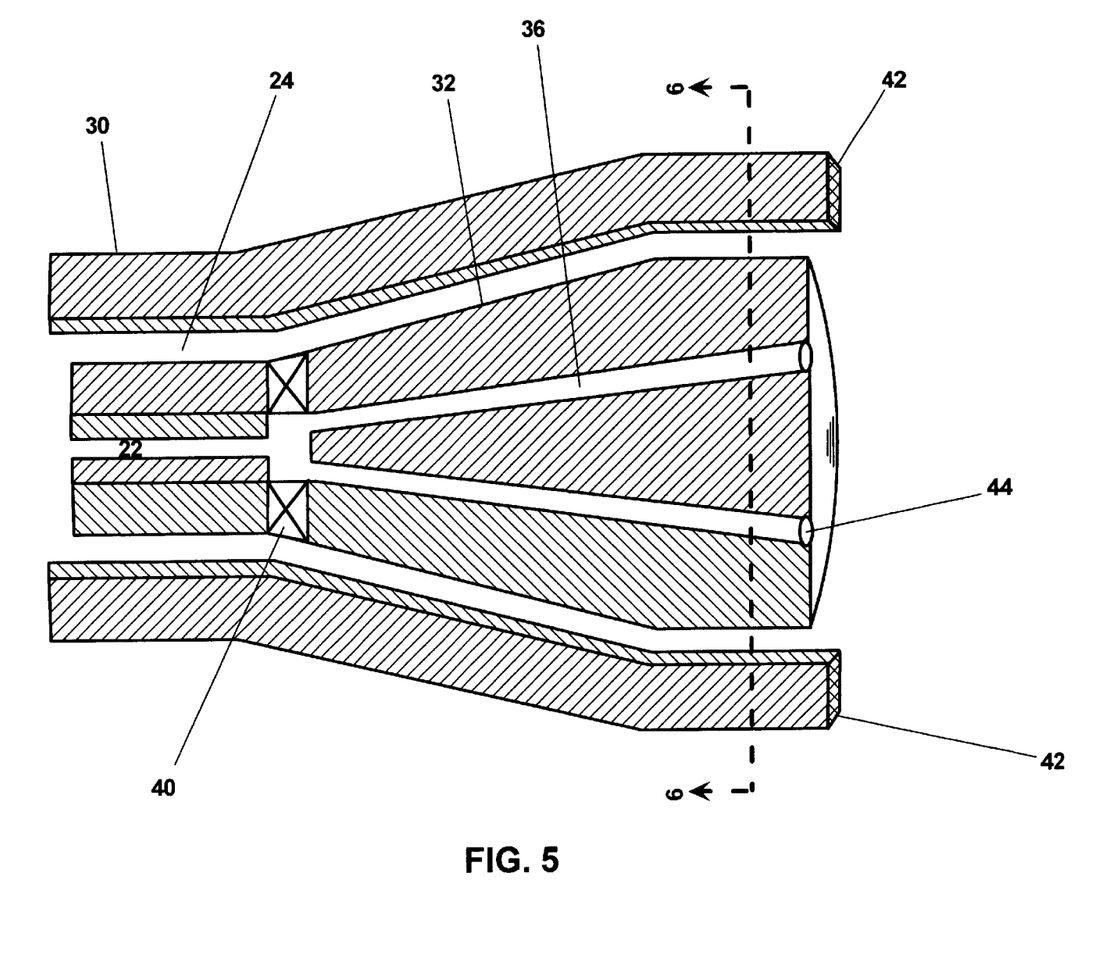
FIG. 5 is a cross sectional view of the nozzle assembly.

FIG. 5 is a cutaway view of ultra-high pressure water nozzle 20. Nozzle 20 consists of outer sheath 30, the inner wall of which and exterior of the rotating section 32 defining a generally conical chamber for suctioning and collecting the water after impingement, including any coating particles removed and suspended in the water. At the distal end of the outer sheath 30 is a water scal 42 consisting of synthetic or natural fibers, rubber, silicon resins or any other suitable material to retain the high pressure water after impingement, until removal by suction. Rotating section 32 contains orifices 36, connected to high pressure water input line 22.

The central axis of each individual orifice 36 is oblique to central axis of nozzle 20. By selecting the lateral displacement of orifice 36, in combination with the orifice oblique angle, the individual annular streams of pressurized water can be converged at a focal point to remove paint from the surface through direct and transverse force vectors. By carefully controlling the angles at which orifices 36 are positioned, and the rotational forces resulting therefrom, it is possible to utilize ultra-high water pressure to effectively clean the working surface being treated. Because the forward thrust of the water suffers some efficiency loss through the nozzle the greater the pressure supplied to the nozzle input, the greater the thrust of the water streams on the working surface. The force of the water leaving the orifices 36 causes rotating section 32 to spin about bearings 40. An alternate embodiment uses compressed air or an electric motor to spin nozzle rotating section 32.

The water jet is directed at ship 1 at sufficient pressure until the surface coating, including paint, is totally removed and bare "white metal" remains. The water jet should be at a pressure which is greater than 30,000 psi and it has been found that a preferred practical range is between 35,000 and 60,000 psi, even though still higher pressure may also be used with caution.

For the procedures described herein, the diameter of the rotating nozzle section 32 is preferably in the range of about eight inches to sixteen inches with a preferred diameter of twelve inches. The distance between the orifice opening 44 on the nozzle rotating section 32 and the surface of the substrate to be cleaned is preferably such that the water velocity at impact is sufficient to remove at least a majority of the coating material within the water stream impact pattern provided by a single pass of one nozzle 20. To accomplish this result, the discharge velocity at the orifice opening 44 is preferably sufficient to provide a water velocity at least about 1,500 ft/sec. Higher impact velocities may be desirable and may be achieved by increasing the water pressure, for example up to about 60,000 psi, and by sizing the orifice bore to provide a higher discharge velocity, for example up to about 3,000 ft/sec. By achieving these velocities, it is possible to clean the surface of a ship hull at a rate of about 150 to about 400 ft$^2$/hour, and preferably from about 200 to 300 ft$^2$/hour. A plurality of nozzles 20 arranged to discharge a plurality of water jets to increase coverage of the area to be stripped. The water flow utilized can be as low as about five gallons per minute and as high as fifty gallons per minute.

Figure 6:
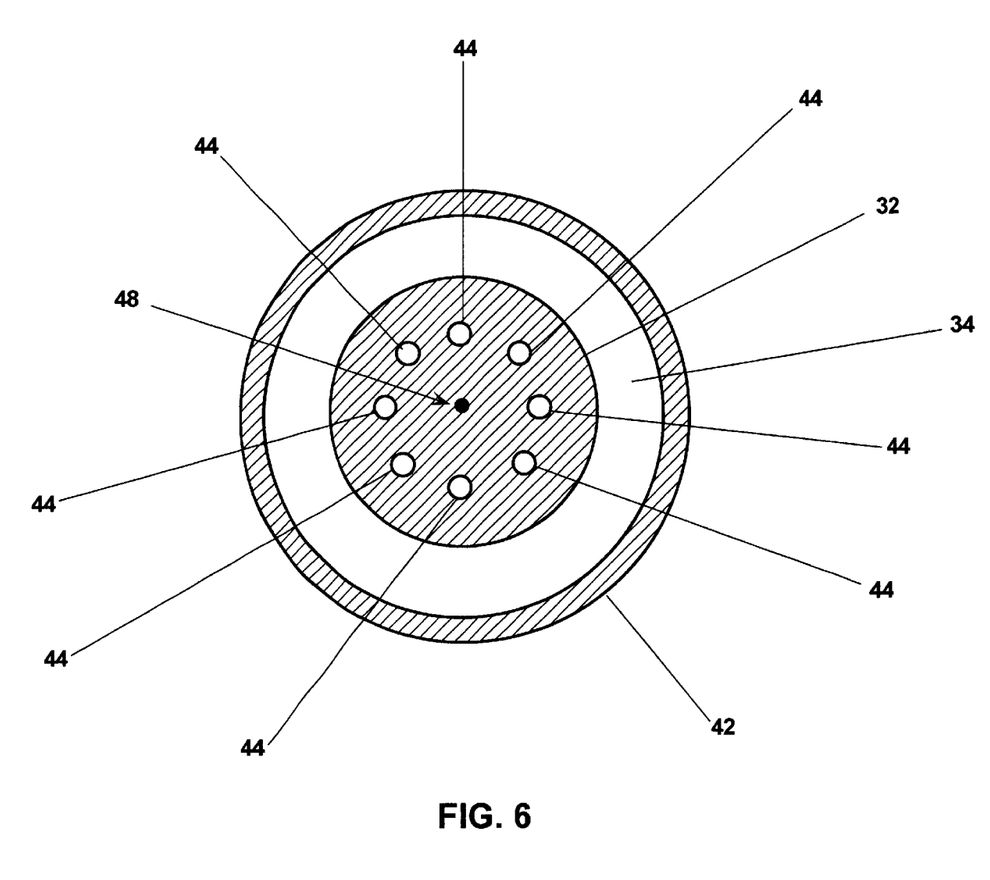
FIG. 6 is a frontal view of FIG. 5 along the lines 6—6.

FIG. 6 is one example of orifice 44 configuration. Nozzles configured with orifices with the greatest oblique angle farthest from the centerline of the nozzle 48 have constantly diverging streams of water. This configuration provides the maximum coverage per sweep of the nozzle 20 but may not provide sufficient cutting action for very deep or hard coatings. Nozzles with the orifices 44 having the lesser oblique angles farthest from centerline 48 will have water streams that converge before diverging. This configuration will provide the maximum cutting action, however over a smaller area.

Figure 7:
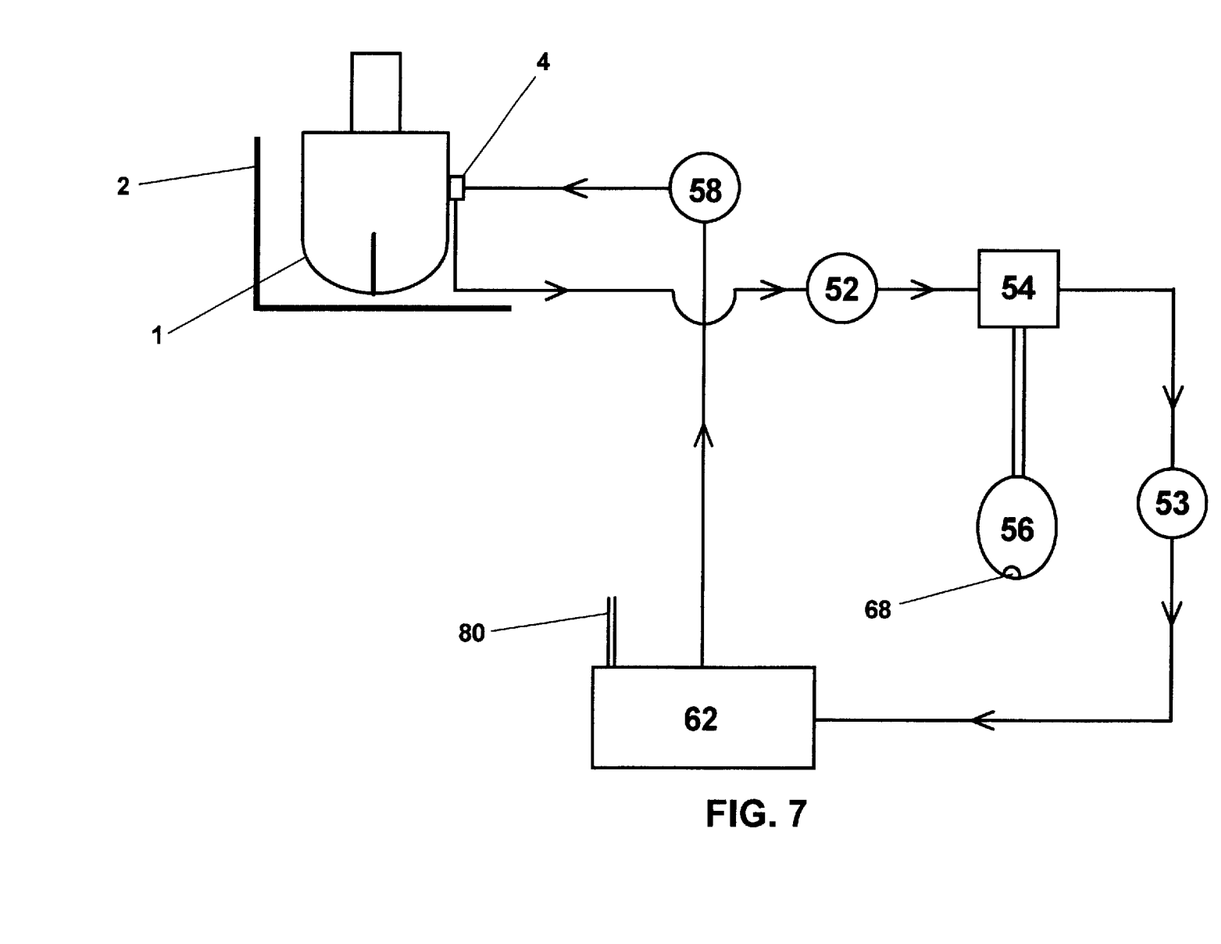
FIG. 7 is a schematic of the coating removal and recycling system.

FIG. 7 depicts the preferred embodiment which includes a recycling system for the water and waste disposal. The recycling system may be integrated into the drydock 2 structure or inserted in a water-tight container 6 for use on site to avoid degradation problems associated with atmospheric salt water deposits. The water is pressurized by pumping means 58 which may be any conventional high compression pump capable of achieving the water pressure desired. Important characteristics of the high pressure water pump 58 include its capacity and horsepower, which are closely related to the flow rate and pressure at which water is ejected through the nozzle 20. Rotating nozzle section 32 in conjunction with a ultra-high pressure pump 58 will provide sufficient pressure to remove the paint while minimizing the reactive thrust of the water leaving the nozzle opening to a backward motion pressure of from about 20 to about 100 PSI. Such low backward pressures enable lower tractive forces to hold platform 4 to the hull 1. Without being limited to a particular ultra high pressure pump system, it should be recognized any commercially available positive displacement, pump, such as a plunger pump may be used herein. An exemplary plunger pump would be one that is rated 5.5 gpm (20.82 Ipm) at 30,000 psi (2,075 bar).

Particulate blasted from the ship hull during cleaning are vacuum removed by lines 24 and suction created by the intake of pump 52. The output pressure of pump 52 sends the water and particulate to filter means 54 to remove the particles from the water. Filtering means 54 may be any standard design capable of handling large volumes of liquid containing suspended particles. The particles of paint are collected, in waste storage tank 56, for further processing and handling. The water is transferred by pump 53 to holding tank 62 to be used again as a stripper agent. Additional water may be added to holding tank 62 via water inlet 80 as required. The particulate matter is removed from waste storage tank 56 via hopper 68 for proper hazardous waste disposal. When needed during cleaning, the water is removed from holding tank 62 and passed by pump 58 to nozzle 20 to be applied to the hull surface to be treated.

The above combination of a movable tractive platform and ultra-high pressure water jet coating removal results in a superior cleaning rate which is less labor intensive, and a "cleaner" surface to apply the next coating to.

While the above description has been directed towards a method to remove paint from the surface of the hull of a waterborne vessel, it is within the scope of the present invention to remove paint from other surfaces such as rolling stock, automobiles, trucks, aircraft, storage tanks, or other structures that would benefit from ultra-high water pressure cleaning.

The invention being thus described, it will be obvious that the same may be varied in many ways. Such variations are not to be regarded as a departure from the spirit and scope of the invention and all such modifications are intended to be included within he scope of the following claims.

What is claimed is:

1. A surface preparation apparatus for removing surface coatings and decreasing salt levels on the ferro-magnetic hull of a ship comprising a movable, remotely controlled body having a frame supporting a cowling, said body including magnetic attraction means for attaching said body to said hull with sufficient force to maintain contact between said cowling and said hull, said cowling forming an enclosure with an open mouth for contacting the hull and forming a movable seal therewith, an ultra-high pressure water jet mounted on said frame and located inside said enclosure, said ultra-high pressure water jet having a pressure of at least 25,000 psi adapted to discharge water through said open mouth, said ultra-high pressure water effectively removing at least a portion of said surface coatings and salts on said hull, said salts including the group consisting of sulfides and chlorides, whereby said hull is substantially free of surface irregularities, salts and contaminants providing increased adhesion for protective coatings.

2. An apparatus of claim 1 wherein said salt levels are reduced to approximately 20 micrograms per cubic centimeter.

3. An apparatus of claim 2 wherein said chloride levels are reduced to less than 20 micrograms per cubic centimeter.

4. An apparatus of claim 3 wherein said cowling includes a source of suction.

5. An apparatus of claim 4 wherein said ultra high pressure water jet is connected to the positive side of a high pressure pump.

6. An apparatus of claim 2 wherein said attraction means includes permanent magnets.

7. An apparatus of claim 6 wherein said permanent magnets are wheels rotatably connected to said frame and adapted to contact the hull.

8. An apparatus of claim 1 wherein said chloride levels are reduced to approximately 10 micrograms per cubic centimeter.

9. An apparatus of claim 1 wherein said chloride levels are reduced to less than 10 micrograms per cubic centimeter.

10. An apparatus of claim 1 wherein a flexible skirt is connected to said open mouth of said cowling, said flexible skirt adapted to from a generally watertight seal between said cowling and said hull.

* * * * *